United States Patent [19]

Halgas

[11] Patent Number: 4,626,269
[45] Date of Patent: Dec. 2, 1986

[54] AUTOMATED SYSTEM FOR SEALING A MOUNT IN A CATHODE-RAY TUBE

[75] Inventor: Chester J. Halgas, Burlington County, N.J.

[73] Assignee: RCA Corporation, Princeton, N.J.

[21] Appl. No.: 799,924

[22] Filed: Nov. 20, 1985

[51] Int. Cl.⁴ .......................................... C03B 23/217
[52] U.S. Cl. ........................................ 65/162; 65/108; 65/252; 65/270; 65/271; 65/284; 65/285; 431/29; 431/256; 431/258
[58] Field of Search ................ 65/252, 108, 113, 162, 65/270, 271, 272, 284, 285; 431/29, 256, 258

[56] References Cited

U.S. PATENT DOCUMENTS

| | | | |
|---|---|---|---|
| 2,725,678 | 12/1955 | Weingarten | 65/155 |
| 2,764,847 | 10/1956 | Buell | 65/113 |
| 2,883,797 | 4/1959 | Eldred | 65/284 |
| 2,939,410 | 6/1960 | Karpuk et al. | 431/29 |
| 3,265,486 | 8/1966 | Bramming | 65/162 |
| 3,318,358 | 5/1967 | Potts | 431/256 |
| 3,377,125 | 4/1968 | Zielinski | 431/256 |
| 4,329,166 | 5/1982 | Murphy | 65/272 X |
| 4,561,874 | 12/1985 | Colacello et al. | 65/36 |
| 4,589,902 | 5/1986 | Colacello et al. | 65/252 |

FOREIGN PATENT DOCUMENTS 670411  4/1952  United Kingdom .................... 65/36

OTHER PUBLICATIONS

U.S. patent application Ser. No. 771,355, entitled Apparatus for Sealing a Mount in a Cathode-Ray Tube, filed Aug. 30, 1985 (=Pat. No. 4,589,902 supra).

*Primary Examiner*—Arthur Kellogg
*Attorney, Agent, or Firm*—E. M. Whitacre; D. H. Irlbeck; T. H. Magee

[57] ABSTRACT

A system for sealing a mount in a cathode-ray tube using first and second tiers of burners includes a first valve in an oxygen supply line and a third valve in a fuel supply line connected to the first tier, and a second valve in the oxygen supply line and a fourth valve in the fuel supply line connected to the second tier for controlling, respectively, the flow of oxygen and fuel therethrough. The system comprises a preignition timing relay responsive to a start signal and coupled to both the first and the third valves for effecting a preignition gas flow period. An ignition timer is responsive to the preignition timing relay and is coupled to both the first and the third valves and to an igniter for effecting an ignition latchup interval at the end of the preignition gas flow period. A first timing relay is responsive to the ignition timer and is coupled to both the first and the third valves for effecting a first-tier gas flow period following the preignition gas flow period. A first overlap timer is responsive to the first timing relay and is coupled to the first valve for continuing the flow of oxygen to the first tier for a first preselected time interval. Also, a second timing relay is responsive to the first timing relay and is coupled to both the second and the fourth valves for effecting a second-tier gas flow period at the end of the first-tier gas flow period.

14 Claims, 4 Drawing Figures

AUTOMATED SYSTEM FOR SEALING A MOUNT IN A CATHODE-RAY TUBE

BACKGROUND OF THE INVENTION

This invention pertains to an automated system for heat sealing an electron gun mount, including a glass stem wafer, into a neck of stationary cathode-ray tube using first and second tiers of burner tips.

A standard cathode-ray tube (CRT) comprises a faceplate panel with a cathodoluminescent screen, a funnel having a protruding neck, and a mount containing an electron gun adapted to emit one or more beams of electrons for striking the screen. The mount includes a glass stem wafer on which the gun is mounted with lead wires, for the gun electrodes, projecting through the wafer. The funnel typically is sealed to the faceplate panel in a high-temperature oven using a glass frit before the mount is sealed to the neck of the funnel. After the frit-sealing step, the mount is seated to the neck by a heat-sealing apparatus which applies high-temperature flames to a localized area around the neck where the seal is to be formed.

In order to accommodate larger CRTs, our copending application entitled APPARATUS FOR SEALING A MOUNT IN A CATHODE-RAY TUBE, Ser. No. 771,355 (RCA 81,523) filed on Aug. 30, 1985 and assigned to RCA Corporation, now U.S. Pat. No. 4,589,902 describes an apparatus for sealing a mount into a neck of a stationary CRT, oriented along an axis. This apparatus comprises two tiers of burner tips. The first tier is disposed completely around the axis at a first distance therefrom and similarly aimed nonradially along directions tangent to a first circle. The second tier of burner tips is disposed completely around the axis below the first tier at a second distance from the axis and similarly aimed nonradially along directions tangent to a second circle. The first distance and the diameter of the first circle are greater, respectively, than the second distance and the diameter of the second circle. The first tier of burner tips is connected to a first combustible gas mixture, and the second tier of burner tips is connected to a second combustible gas mixture different from the first mixture. In utilizing this double-tier burner, the neck-in, cut-off and sealing operations are coordinated by controlling the oxygen and fuel supplied to each tier of burner tips. The present invention provides an automated system for precisely sequencing and timing this heat sealing procedure in order to achieve repeatable neck seal profiles and prevent tube contamination during the sealing operation.

SUMMARY OF THE INVENTION

A system for sealing a mount in a cathode-ray tube using first and second tiers of burners includes a first valve in an oxygen supply line and a third valve in a fuel supply line connected to the first tier, and a second valve in the oxygen supply line and a fourth valve in the fuel supply line connected to the second tier for controlling, respectively, the flow of oxygen and fuel therethrough. The system comprises preignition timing means responsive to a start signal and coupled to both the first and the third valves for effecting a preignition gas flow period. An ignition timer is responsive to the preignition timing means and is coupled to both the first and the third valves and to an igniter for effecting an ignition latchup interval at the end of the preignition gas flow period. A first timing means is responsive to the ignition timer and is coupled to both the first and third valves for effecting a first-tier gas flow period following the preignition gas flow period. A first overlap timer is responsive to the first timing means and is coupled to the first valve for continuing the flow of oxygen to the first tier for a first preselected time interval. Also, a second timing means is responsive to the first timing means and is coupled to both the second and the fourth valves for effecting a second-tier gas flow period at the end of the first-tier gas flow period.

DETAILED DESCRIPTION OF THE PREFERRED EMBODIMENTS

Figure 1:
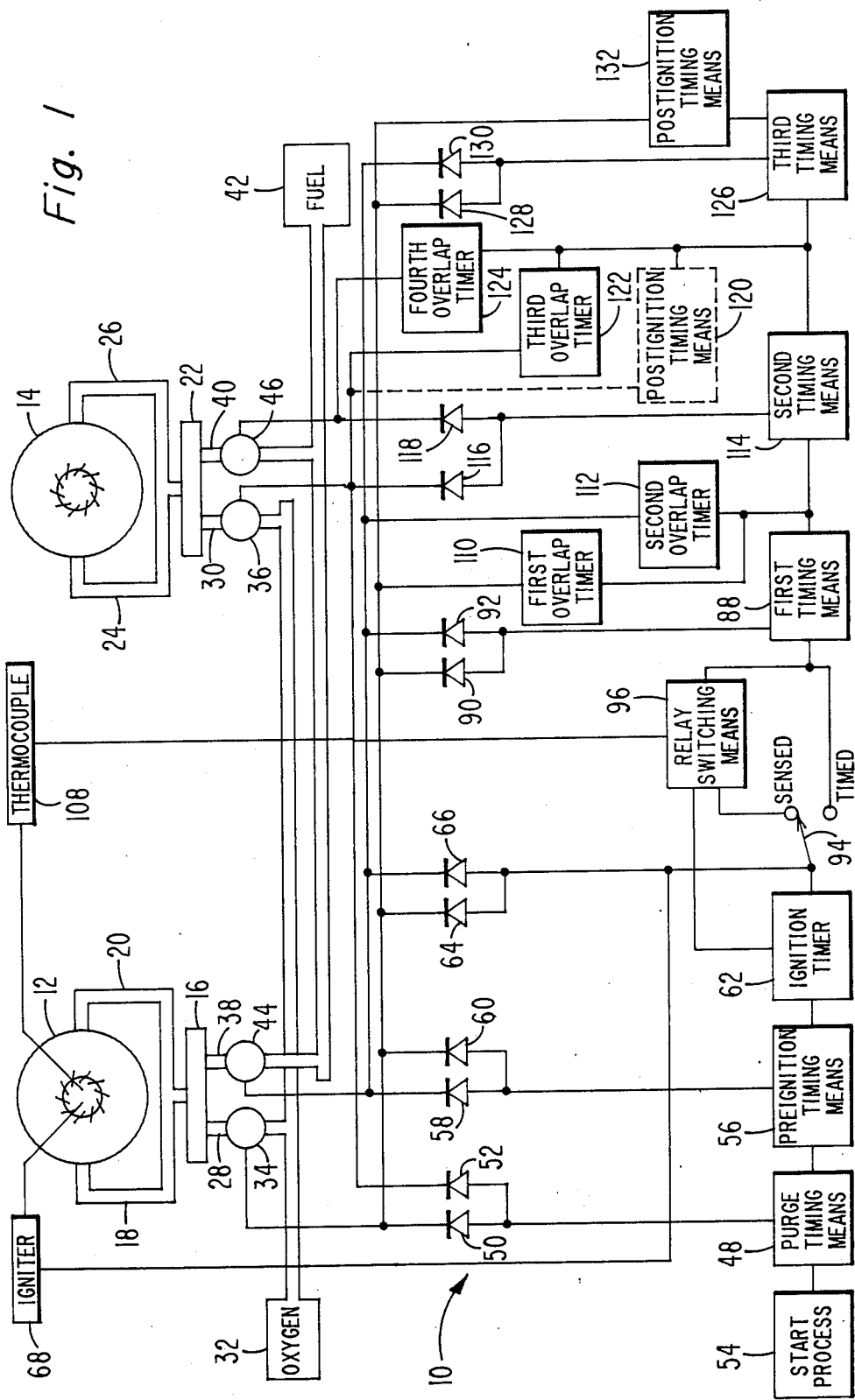
FIG. 1 is a diagrammatic view of an automated system for sealing a mount in a CRT using a double-tier burner.

FIG. 1 of the drawing shows a schematic layout of a system 10 for sealing a mount in a cathode-ray tube (CRT) using first and second tiers 12 and 14 of burner tips. The first tier 12 of burner tips is disposed completely around the neck of the CRT (not shown) at a first distance therefrom and similarly aimed nonradially along directions tangent to a first circle. The second tier 14 of burner tips is disposed completely around the neck, below the first tier, at a second distance therefrom and similarly aimed nonradially along directions tangent to a second circle. Each of the tiers 12 and 14 has twenty-four burner tips therein. The first tier 12 of burner tips is connected to a first gas premixer 16 via combustible gas lines 18 and 20. The second tier 14 of burner tips is connected to a second gas premixer 22 via combustible gas lines 24 and 26.

First and second oxygen supply lines 28 and 30 are connected, respectively, to the first and second gas premixers 16 and 22. The other ends of the first and second oxygen supply lines 28 and 30 are connected to a source 32 of oxygen, and have first and second valves 34 and 36 disposed therein, respectively, for controlling the flow of oxygen therethrough. First and second fuel supply lines 38 and 40 are connected, respectively, to the first and second gas premixers 16 and 22. The other ends of the first and second fuel supply lines 38 and 40 are connected to a source 42 of fuel, such as natural gas, and have third and fourth valves 44 and 46 disposed therein, respectively, for controlling the flow of fuel therethrough. In the present example, the first, second, third and fourth valves 34, 36, 44 and 46 are solenoid operated valves. The fuel supply lines 38 and 40 typically have a pressure of about $5 \times 10^4$ dynes/cm$^2$ (0.75 psi), and the oxygen supply lines 28 and 30 typically have a pressure of about $7 \times 10^5$ dynes/cm$^2$ (10 psi).

A purge timing means 48 is coupled to both the first and the second valves 34 and 36, via gating diodes 50 and 52, for effecting a preliminary oxygen purge period. The purge timing means 48 comprises a single-shot mode multivibrator, and is responsive to a start signal received from a start unit 54. In the present system 10, the multivibrators are single shot Multi-Timers, Model No. OLRB 24VDC, manufactured by Syrelec Corporation in Dallas, Tex.

A preignition timing means 56 is coupled to both the first and the third valves 34 and 44, via gating diodes 58 and 60, for effecting a preignition gas flow period. In the present embodiment, the preignition timing means 56 comprises a single-shot mode multivibrator, and is responsive to a start signal. An ignition timer 62 is coupled to both the first and the third valves 34 and 44, via gating diodes 64 and 66, and to an igniter probe 68 for effecting an ignition latchup interval at the end of the preignition gas flow period. The ignition timer 62 comprises a reactance pulse relay which is responsive to the preignition timing means 56. The igniter probe 68 provides sparks in close proximity to the first tier 12 of burner tips, in order to ignite the burner tips when they are provided with a combustible gas mixture. In the present example, the igniter probe 68 is Model No. APR manufactured by Adams Manufacturing Company in Cleveland, Ohio.

Figure 2:
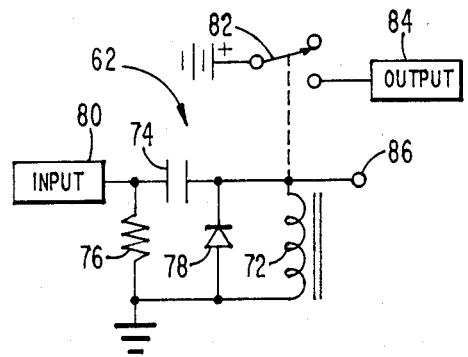
FIG. 2 is a circuit diagram of a timer used in the automated system.

FIG. 2 shows the ignition timer 62 used in the present automated system 10. The timer 62 comprises a reactance circuit having an inductor 72 and a capacitor 74 in parallel with a resistor 76. A protective diode 78 is in parallel with the inductor 72. When a positive potential is placed on an input 80, the capacitor 74 becomes charged by a transient current which flows through the inductor 72 for a given time period having a duration dependent mainly upon the size of the capacitor 74. The charging of the capacitor 74 causes the inductor 72 to close a switch 82, thereby completing a circuit to an output 84 during this time period. The ignition timer 62 also has a terminal 86 for receiving a positive potential which causes a steady current to flow through the inductor 72 to ground for an indefinite time period, as described further below.

A first timing means 88 is coupled to both the first and the third valves 34 and 44, via gating diodes 90 and 92, for effecting a first-tier gas flow period following the preignition gas flow period. The first timing means 88 comprises a single-shot mode multivibrator, and is responsive to the ignition timer 62 via an ignition mode switch 94 which has a "sensed" mode and a "timed" mode, as shown in FIG. 1. If the ignition mode switch 94 is set in the timed mode, then the first timing means 70 is immediately responsive to the ignition timer 62. In other words, the first timing means 88 starts clocking as soon as the ignition timer 62 is activated. If the ignition mode switch 94 is set in the sensed mode, as shown in FIG. 1, then the first timing means 88 is responsive to the ignition timer 62 through relay switching means 96.

Figure 3:
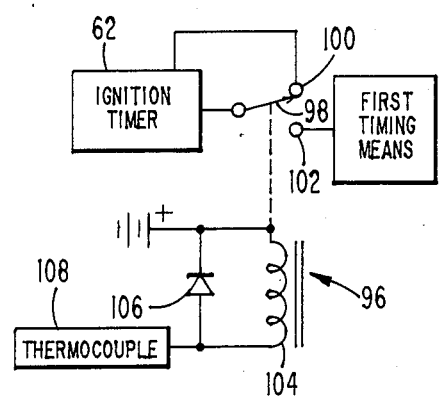
FIG. 3 is a circuit diagram of a relay switching means used in the automated system.

FIG. 3 shows the relay switching means 96 which comprises an inductance operated switch 98 having a first position 100 coupled back to the ignition timer 62, and a second position 102 coupled to the first timing means 88. The first position 100 completes a circuit back to the terminal 86 of the ignition timer 62, which keeps the switch 82 of the ignition timer 62 closed until the switch 98 is moved to the second position 102 by an inductor 104. The inductor 104 has a protective diode 106 in parallel therewith, and is connected to means 108 for sensing the temperature of the first tier 12 of burner tips. In the present example, the temperature sensing means 108 comprises a thermocouple which, when the first tier 12 reaches a certain temperature, draws current through the inductor 104, thereby moving the switch 98 to the second position 102.

A first overlap timer 110 is coupled to the first valve 34, as shown in FIG. 1, for continuing the flow of oxygen to the first tier 12 for a first preselected time interval following the first-tier gas flow period. The first overlap timer 110 comprises a reactance pulse relay, similar to that shown in FIG. 2, which is responsive to the first timing means 88. The present system 10 further comprises a second overlap timer 112, coupled to the third valve 44, for continuing the flow of fuel to the first tier 12 for a third preselected time interval following the first-tier gas flow period. The second overlap timer 110 also comprises a reactance pulse relay, similar to that shown in FIG. 2, which is responsive to the first timing means 88.

A second timing means 114 is coupled to both the second and the fourth valves 36 and 46, via gating diodes 116 and 118, for effecting a second-tier gas flow period at the end of the first-tier gas flow period. The second timing means 114 comprises a single-shot mode multivibrator, and is responsive to the first timing means 88.

In one embodiment of the present invention, shown by the dotted line in FIG. 1, the automated system 10 further comprises postignition timing means 120, coupled to the second valve 36, for continuing the flow of oxygen to the second tier 14 for a second preselected time interval following the second-tier gas flow period. The postignition timing means 120 comprises a single-shot mode multivibrator, and is responsive to the second timing means 114.

In a second embodiment of the present invention, the automated system 10 further comprises a third overlap timer 122, coupled to the second valve 36, for continuing the flow of oxygen to the second tier 14 for the first preselected time interval following the second-tier gas flow period. The third overlap timer 122 comprises a reactance pulse relay, similar to that shown in FIG. 2, which is responsive to the second timing means 114. A fourth overlap timer 124 is coupled to the fourth valve 46, in order to continue the flow of fuel to the second tier 14 for the third preselected time interval following the second-tier gas flow period. The fourth overlap timer 124 comprises a reactance pulse relay, similar to that shown in FIG. 2, which is responsive to the second timing means 114.

The second embodiment further comprises a third timing means 126 coupled to both the first and the third valves 34 and 44, via gating diodes 128 and 130, for effecting a sealing gas flow period. The third timing means 126 comprises a single-shot mode multivibrator, and is responsive to the second timing means 114. In addition, postignition timing means 132 is coupled to the first valve 34, in order to continue the flow of oxygen to the first tier 12 for the second preselected time interval following the sealing gas flow period. The postignition timing means 132 also comprises a single-shot mode multivibrator, and is responsive to the third timing means 126.

Figure 4:
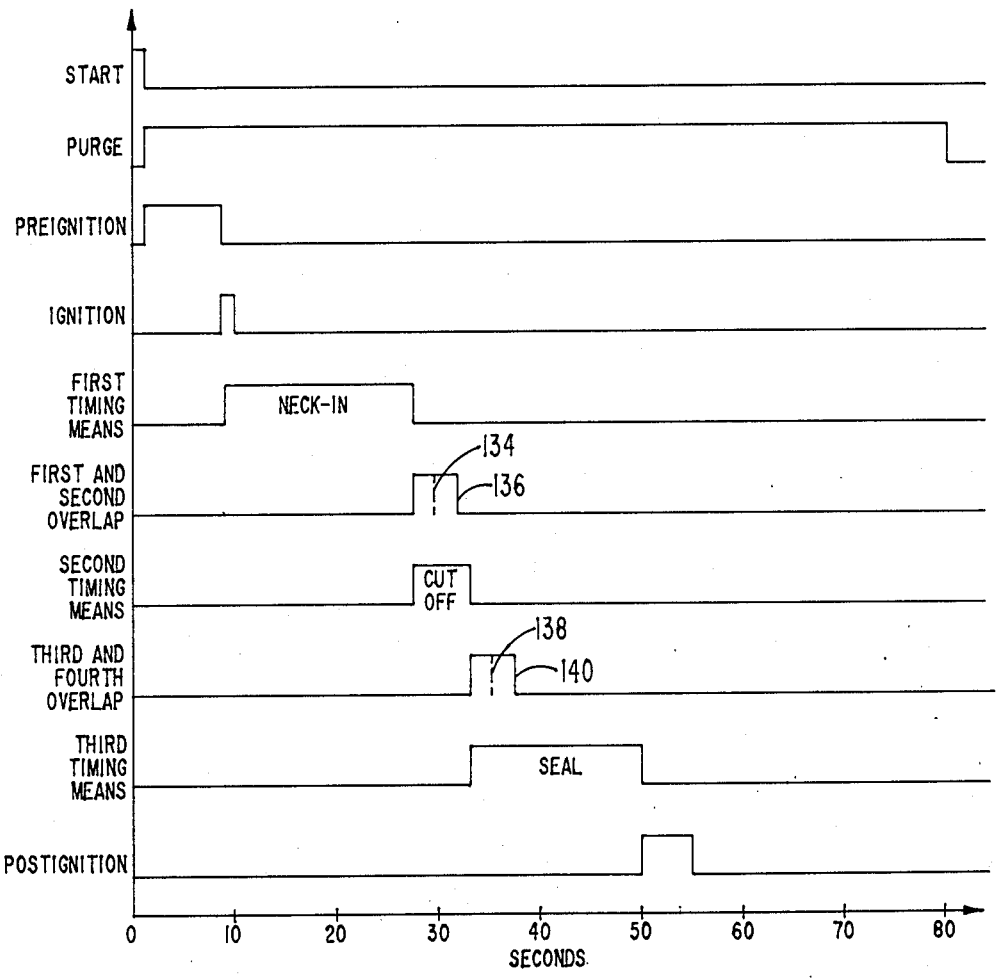
FIG. 4 is a timing function graph illustrating the operating sequence in using the automated system.

FIG. 4 shows a timing function graph which illustrates the sequence of operation in using the automated system 10. After a start signal is received from the start unit 54, both the first and the second tiers 12 and 14 of burner tips are purged with oxygen for a preliminary oxygen purge period of approximately eighty seconds. This purge period is performed typically once a day, and is not repeated prior to sealing each mount in a CRT but is bypassed by a switch (not shown).

The preignition timing means 56 receives a start signal at the beginning of each mount sealing operation. Upon receiving this signal, the preignition timing means 56 starts clocking and sends a signal to open both the first and the third solenoid valves 34 and 44, which allows oxygen and fuel to enter the first gas premixer 16, thereby sending a first combustible gas mixture to the first tier 12 of burner tips. This preignition flow continues for approximately seven seconds, after which time the preignition timing means 56 clocks out and sends a signal to the ignition timer 62.

The switch in the ignition timer 62 closes upon receiving this signal, which keeps both the first and the third valves 34 and 44 open and also activates the igniter probe 68. The igniter probe 68 issues a series of sparks which ignites the first tier 12 of burner tips. The duration of this sparking period is dependent upon whether the ignition mode switch 94 is set in the sensed or timed mode. If the ignition mode switch 94 is set in the timed mode, then the sparking period is fixed by the ignition timer 62 and lasts for approximately one second. If the ignition mode switch 94 is set in the sensed mode, then the sparking period is dependent upon the temperature sensing means 108 which controls the ignition timer 62 through the relay switching means 96. In the sensed mode, as soon as the first tier 12 reaches a predetermined temperature, the temperature sensing means 108 moves the switch 98 of the relay means 96 to the second position 102, thereby opening the switch in the ignition timer 62 and sending a signal to the first timing means 88 which starts clocking.

When the first timing means 88 starts clocking, a signal is sent to the first and third valves 34 and 44 which continues to keep the valves 34 and 44 open until the first timing means 88 clocks out. The duration of this clocking period establishes a suitable neck-in time, which is typically eighteen seconds for a CRT having an outer neck diameter of twenty-nine millimeters. Upon clocking out, the first timing means 88 sends a signal to the second timing means 114 and also the first and the second overlap timers 110 and 112.

The second timing means 114 starts clocking and sends a signal to the second and the fourth valves 36 and 46, which allows oxygen and fuel to enter the second gas premixer 22, thereby sending a second combustible gas mixture to the second tier 14 of burner tips. At this time, the flames at the first tier 12 of burner tips immediately ignite the second tier 14. However, in order to ensure a continuity of flames when switching from the first tier 12 to the second tier 14, the switches in the first and the second overlap timers 110 and 112 close and, thereby, continue the flow of oxygen and fuel, respectively, to the first tier 12 of burner tips. The second overlap timer 112 keeps the third valve 44 open for a third preselected time interval, which is approximately two seconds, after which time the switch of the second overlap timer 112 opens and causes the third valve 44 to close, shown by the dotted line 134 in FIG. 4. The first overlap timer 110 keeps the first valve 34 open for a first preselected time interval, which is approximately four seconds, after which time the switch of the first overlap timer 110 opens and causes the first valve 34 to close, as shown by the line 136 in FIG. 4.

It was discovered that it is important to close the third valve 44 before closing the first valve 34. In other words, the first preselected time interval must be greater than the third preselected time interval in order to allow the oxygen to continue to flow to the first tier 12 for a short period of time after the fuel thereto has been secured. If the fuel is not shut off before the oxygen is shut off, then a small combustible explosion or "pop" occurs at the burner tips, which is thought to be caused by the difference in pressure between the oxygen supply lines 28 and 30 and the fuel supply lines 38 and 40. Such a combustible pop should be prevented since it causes detrimental contamination of both the CRT and the burner tips.

In the one embodiment of the present invention, the duration of the clocking period for the second timing means 114 establishes both a suitable cut-off time, which is typically about five seconds, and a suitable sealing time, which is typically about seventeen seconds, for a total second-tier gas flow period of twenty-two seconds for the twenty-nine millimeter neck. In other words, the second tier 14 of burner tips accomplishes both the cut-off and sealing operations in one embodiment. In this embodiment, when the second timing means 114 clocks out, a signal is sent to the postignition timing means 120. The postignition timing means 120 keeps the second valve 36 open for a second preselected time interval, which is approximately five seconds. The purpose of the postignition timing means 114 is to continue the flow of oxygen to the second tier 14 of burner tips after the fuel thereto has been secured, thereby preventing the above-mentioned contamination and acting as a safety measure to ensure that all fuel has been purged from the second tier 14.

In the second embodiment of the present invention, the second timing means 114 establishes only the suitable cut-off time, and the flames switch back to the first tier 12 of burner tips for the sealing operation. In this embodiment, when the second timing means 114 clocks out after five seconds, as shown in FIG. 4, a signal is sent to the third timing means 126 and also the third and the fourth overlap timers 122 and 124. The third timing means 126 starts clocking and sends a signal to the first and the third valves 34 and 44, which allows oxygen and fuel to again enter the first gas premixer 16, thereby sending a combustible gas mixture to the first tier 12 of burner tips. At this time, the flames at the second tier 14 of burner tips ignite the first tier 12. In order to ensure a continuity of flames when switching back to the first tier 12, the switches in the third and the fourth overlap timers 122 and 124 close, and, thereby, continue the flow of oxygen and fuel, respectively, to the second tier 14 of burner tips. The fourth overlap timer 124 keeps the fourth valve 46 open for the third preselected time interval, which is approximately two seconds, after which time the switch of the fourth overlap timer 124 opens and causes the fourth valve 46 to close, as shown by the dotted line 138 in FIG. 4. The third overlap timer 122 keeps the second valve 36 open for the first preselected time interval, which is approximately four seconds, after which time the switch of the third overlap timer 122 opens and causes the second valve 36 to close, as shown by the line 140 in FIG. 4. By keeping the second valve 36 open for longer than two seconds after the second timing means 114 has clocked out, the undesirable pop is avoided.

In this second embodiment, the third timing means 126 establishes the suitable sealing time, which is about seventeen seconds, as shown in FIG. 4. When the third timing means 126 clocks out, a signal is sent to the postignition timing means 132 which keeps the first valve 34 open for the second preselected time interval, which is approximately five seconds. Again, the purpose of this postignition timing means 132 is to prevent contamination and to purge all fuel from the first tier 12.

The present invention provides an automated system 10 which establishes the precise sequencing and timing required for sealing electron guns into CRT necks using the double-tier burner. The neck-in, cut-off and sealing operations are coordinated by using the present system 10 to control the oxygen and fuel supplied to each tier 12 and 14 of burner tips. Use of the present system 10 in a production line makes it possible to achieve repeatable neck seal profiles and prevents tube contamination during the double-tier sealing operation.

What is claimed is:

1. An automated system for sealing a mount in a cathode-ray tube using first and second tiers of burner tips comprising:
    first and second oxygen supply lines connected, respectively, to said first and said second tiers, and having first and second valves disposed therein, respectively, for controlling the flow of oxygen therethrough;
    first and second fuel supply lines connected, respectively, to said first and said second tiers, and having third and fourth valves disposed therein, respectively, for controlling the flow of fuel therethrough;
    preignition timing means responsive to a start signal and coupled to both said first and said third valves for effecting a preignition gas flow period;
    an ignition timer responsive to said preignition timing means and coupled to both said first and said third valves and to an igniter for effecting an ignition latchup interval at the end of said preignition gas flow period;
    a first timing means responsive to said ignition timer and coupled to both said first and said third valves for effecting a first-tier gas flow period following said preignition gas flow period;
    a first overlap timer responsive to said first timing means and coupled to said first valve for continuing the flow of oxygen to said first tier for a first preselected time interval following said first-tier gas flow period; and
    a second timing means responsive to said first timing means and coupled to both said second and said fourth valves for effecting a second-tier gas flow period at the end of said first-tier gas flow period.

2. A system as defined in claim 1 further comprising postignition timing means responsive to said second timing means and coupled to said second valve for continuing the flow of oxygen to said second tier for a second preselected time interval following said second-tier gas flow period.

3. A system as defined in claim 2 further comprising a second overlap timer responsive to said first timing means and coupled to said third valve for continuing the flow of fuel to said first tier for a third preselected time interval following said first-tier gas flow period.

4. A system as defined in claim 3 wherein said postignition timing means comprises a single-shot mode multivibrator, said second overlap timer comprises a reactance pulse relay, and wherein said second preselected time interval is approximately five seconds, and said third preselected time interval is approximately two seconds.

5. A system as defined in claim 1 further comprising:
    a third overlap timer responsive to said second timing means and coupled to said second valve for continuing the flow of oxygen to said second tier for said first preselected time interval following said second-tier gas flow period; and
    a third timing means responsive to said second timing means and coupled to both said first and said third valves for effecting a sealing gas flow period.

6. A system as defined in claim 5 further comprising postignition timing means responsive to said third timing means and coupled to said first valve for continuing the flow of oxygen to said first tier for said second preselected time interval following said sealing gas flow period.

7. A system as defined in claim 6 further comprising a fourth overlap timer responsive to said second timing means and coupled to said fourth valve for continuing the flow of fuel to said second tier for said third preselected time interval following said second-tier gas flow period.

8. A system as defined in claim 7 wherein said third and said postignition timing means comprise single-shot multivibrators, said third and said fourth overlap timers comprise reactance pulse relays, and wherein said sealing gas flow period is approximately seventeen seconds.

9. A system as defined in claim 1 further comprising relay switching means having a first position coupled to said ignition timer, and having a second position coupled to said first timing means, said relay switching means being responsive both to said ignition timer and to means for sensing the temperature of said first tier of burner tips.

10. A system as defined in claim 9 wherein said relay switching means comprises an inductance operated switch, and said temperature sensing means comprises a thermocouple.

11. A system as defined in claim 1 further comprising a purge timing means responsive to said start signal and coupled to both said first and said second valves for effecting a preliminary oxygen purge period.

12. A system as defined in claim 11 wherein said purge timing means comprises a single-shot mode multivibrator, and wherein said preliminary oxygen purge period is approximately eighty seconds.

13. A system as defined in claim 1 wherein said valves are solenoid operated valves, said preignition, said first and said second timing means comprise single-shot mode multivibrators, and said ignition and said first overlap timers comprise reactance pulse relays.

14. A system as defined in claim 13 wherein said preignition gas flow period is approximately seven seconds, said first-tier gas flow period is approximately eighteen seconds, said first preselected time interval is approximately four seconds, and said second-tier gas flow period is approximately twenty-two seconds.

* * * * *